A. C. DANVER.
BRAKE ROD SUPPORT FOR AUTOMOBILES.
APPLICATION FILED NOV. 7, 1913.

1,178,059.

Patented Apr. 4, 1916.

WITNESSES:
C. K. Hannigan
Edith M. Bromley

INVENTOR:
Andrew C. Danver
By James L. Jenks
Attorney

UNITED STATES PATENT OFFICE.

ANDREW C. DANVER, OF PAWTUCKET, RHODE ISLAND.

BRAKE-ROD SUPPORT FOR AUTOMOBILES.

1,178,059.  Specification of Letters Patent.  Patented Apr. 4, 1916.

Application filed November 7, 1913. Serial No. 799,639.

*To all whom it may concern:*

Be it known that I, ANDREW C. DANVER, a citizen of the United States, residing at 8 Humes street, Pawtucket, in the county of Providence and State of Rhode Island, have invented certain new and useful Improvements in Brake-Rod Supports for Automobiles, of which the following is a specification.

My invention relates to improvements in brake-rod supports for automobiles, and the purpose of my invention is to provide a support which can be applied to the brake-rod at any portion thereof between its two extremities without the necessity of disconnecting the brake-rod, and which can also be attached to some fixed portion of the frame work of the automobile in the same manner.

Another object of my invention is to provide a support that will hold the brake-rod securely and prevent its rattling, without in any manner interfering with its longitudinal movement.

I accomplish these results by the device shown in the accompanying drawing, in which—

Figure 2:
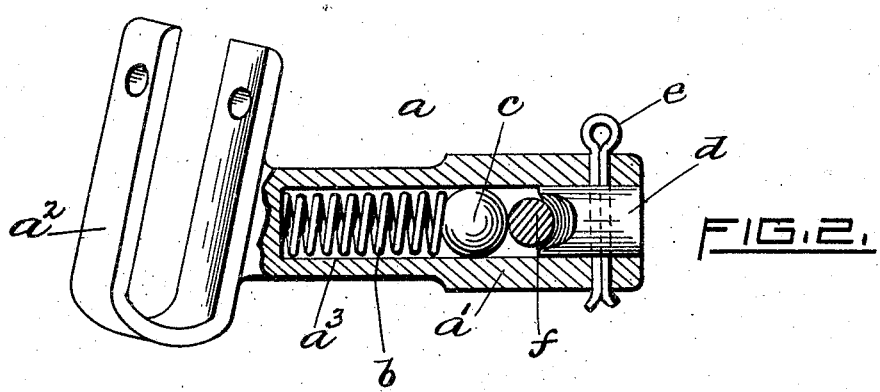
Figure 1:
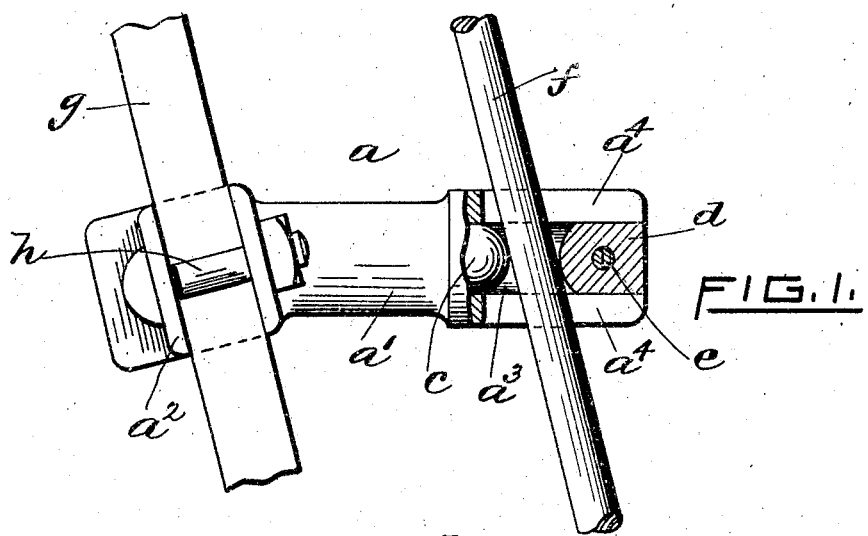

Figure 1 is a plan view of my device having the portion adjacent to the brake-rod cut away. Fig. 2 is a partial sectional view of the support cut in a plane at right angles to the direction of the brake-rod, while Fig. 3 is a view showing the manner in which the support is fixed to some immovable member of the automobile.

The same parts are indicated by the same letters throughout the several views.

In Fig. 1 $f$ is a portion of a brake-rod, while $g$ is the torsion rod of an automobile, the support being in this particular instance adapted to fit said torsion rod, although it may be equally well adapted to fit some other fixed portion of an automobile.

Figure 3:
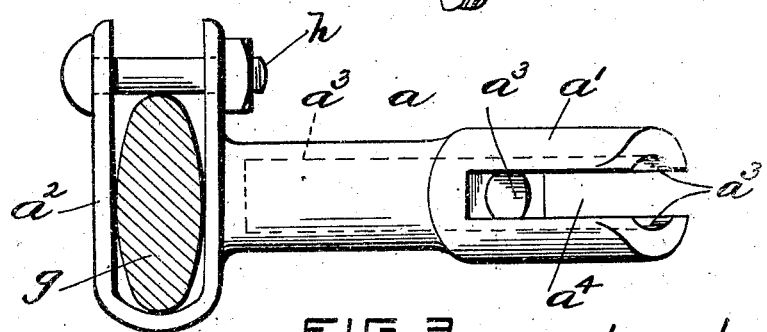

$a$ represents the support as a whole, which consists essentially of a tubular body $a'$ having opposite portions of its side wall cut away by the slot $a^4$, seen best in Fig. 3, the width of this slot being such as to admit easily the brake-rod therein. The extremity of the support adjacent to the brake-rod is somewhat enlarged, as will be seen in the drawings, and the extremity which is applied or affixed to some standing portion of the vehicle is U shaped, as shown at $a^2$ through the various figures, the two limbs of the U being capable of being drawn together by means of the bolt $h$, Figs. 1 and 2.

$g$ in Fig. 3 represents a section of a torsion rod enclasped by the U shaped extremity $a^2$ of the brake-rod support. The main body of the device $a'$ is circular in cross section and consists essentially of an elongated tube, the tubular portion being shown at $a^3$ throughout the various views. Within the tubular portion $a^3$ is the spiral spring $b$. This spring is held in place and is compressible by the ball $c$ which is an ordinary steel ball loosely fitting in the tube $a^3$.

$d$ is a plug or stop holding the brake-rod $f$ in place against the ball $c$ by means of a cotter pin $e$.

In all the brake-rod supports known to this applicant the only way of attaching the support to the brake-rod is by disconnecting one end of the rod from its connections and sliding the support over it, a very awkward and inconvenient operation to perform; my device remedies this and enables the support to be easily applied to the rod at any portion thereof by simply removing the stop $d$ and introducing the brake-rod through the slot $a^4$.

In Figs. 1 and 3, the part to which the support is clamped is the torsion rod $g$, and the support is applied to this by removing the bolt $h$ and sliding the open end of the U over the torsion rod and then drawing the open ends of the U tightly together by means of the bolt $h$. The relative sizes of the spring $b$, the ball $c$, and the stop $d$, are such as to bring a moderate degree of compression against the brake rod $f$ sufficient to prevent lateral movement but not such as to prevent the movement of the rod $f$ in the direction of its length.

The shape of the stop $d$ is important, because if the stop $d$ were perfectly flat at the extremity in contact with $f$ there would be a tendency for the rod $f$ to cramp or bind in the support unless there were perfect parallelism between the face of the stop $d$ and the axis of the rod $f$. I have therefore made the groove of the stop $d$ convex toward the brake-rod, as shown in Fig. 2. It will thus be seen that a considerable latitude is allowed in the relative positions of the brake-rod and the support without causing the rod to bind in the latter, inasmuch as the only contact between the support and the rod is the point of contact with the ball and the line of contact with the stop. In order further to lessen friction between the rod and the parts adjacent thereto, the tubular portion $a^3$ of the support may be filled with grease of a proper consistency, thus keeping the points of contact between the rod $f$ and the adjacent parts of the support suitably lubricated. My device is made preferably of metal.

Having now described my invention, what I claim and desire to secure by Letters Patent is—

1. In a brake-rod support for automobiles, a convexly grooved member forming a bearing for one side of the brake-rod; a ball forming a bearing for the opposite side of said rod; and means for retaining said ball and grooved member in fixed relation to some fixed member of the automobile, substantially as set forth.

2. A brake-rod support for automobiles comprising a tubular-member having at one end a slot adapted to admit a brake-rod laterally, and terminating at its other end in a clamp adapted to receive and to be secured to some fixed portion of the vehicle; both said clamp and said slot being attachable to their respective contents at any point of the latter intermediate their ends; and means for establishing a sliding contact between said support and said brake-rod and for holding the latter in place and permitting free longitudinal movement thereof, substantially as described.

3. In a brake-rod support for automobiles, a tubular body having one end slotted so as to admit of the lateral introduction of the brake-rod; a spiral spring within the tubular body; and contact members for said brake-rod consisting of a ball situated between said rod and said spring, and a convexly grooved stop in contact with said rod opposite said ball, substantially as set forth.

4. A brake-rod support for automobiles consisting of a tubular body, open at one end and terminating at said open end in a slot adapted to permit the lateral introduction of the brake-rod at any point of the latter; and at the other end in a clamp attachable to a fixed member of the automobile; a spiral spring within the tubular body of the support; a ball situated between said rod and said spring; and a removable, convexly grooved stop suitably retained in the slotted end of said support and operating to hold said rod in place and maintain a suitable tension between said rod and said spring, substantially as set forth.

In testimony whereof I affix my signature in presence of two witnesses.

ANDREW C. DANVER.

Witnesses:
ROSCOE M. DEXTER,
J. P. A. NOLAN.